(12) United States Patent
Nishimine (10) Patent No.: US 10,393,255 B2
(45) Date of Patent: Aug. 27, 2019

(54) TRAVELING CONTROL DEVICE FOR VEHICLE, VEHICLE

(71) Applicant: TOYOTA JIDOSHA KABUSHIKI KAISHA, Toyota-shi, Aichi-ken (JP)

(72) Inventor: Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 15/690,785

(22) Filed: Aug. 30, 2017

(65) Prior Publication Data

US 2018/0066750 A1 Mar. 8, 2018

(30) Foreign Application Priority Data

Sep. 7, 2016 (JP) ................................ 2016-175082

(51) Int. Cl.
| | |
|---|---|
| *F16H 61/02* | (2006.01) |
| *F16H 59/14* | (2006.01) |
| *F16H 59/44* | (2006.01) |
| *F16H 61/12* | (2010.01) |
| *F16H 61/16* | (2006.01) |

(52) U.S. Cl.
CPC ......... *F16H 61/0248* (2013.01); *F16H 59/14* (2013.01); *F16H 59/44* (2013.01); *F16H 61/12* (2013.01); *F16H 61/16* (2013.01); *F16H 2200/2023* (2013.01)

(58) Field of Classification Search
CPC ...... F16H 59/44; F16H 61/02; F16H 61/0248; F16H 61/08; F16H 61/16; F16H 2061/1244; F16H 2061/161
See application file for complete search history.

(56) References Cited

U.S. PATENT DOCUMENTS

| | | | | |
|---|---|---|---|---|
| 5,053,961 | A | * 10/1991 | Genise | .................... F16H 59/02 701/52 |
| 5,612,874 | A | * 3/1997 | Schulz | ................ F16H 61/0021 477/163 |
| 5,906,645 | A | 5/1999 | Kagawa et al. | |
| 2008/0234105 | A1* | 9/2008 | Sakamoto | ............... F16H 61/12 477/124 |

FOREIGN PATENT DOCUMENTS

JP H09-222922 A 8/1997

* cited by examiner

*Primary Examiner* — Edwin A Young
(74) *Attorney, Agent, or Firm* — Oliff PLC (57) ABSTRACT

A traveling control device for a vehicle includes an electronic control device. The vehicle includes a transmission constituting a part of a power transmission path between a drive power source and drive wheels. The electronic control device is configured to execute a gear shift of the transmission based on a traveling state, switch automatic driving by automatic driving control and manual driving by a driving operation from a driver, and inhibit switching between the automatic driving and the manual driving until the gear shift of the transmission is completed after the gear shift of the transmission starts.

8 Claims, 6 Drawing Sheets

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT    BLANK: RELEASE

TRAVELING CONTROL DEVICE FOR VEHICLE, VEHICLE

INCORPORATION BY REFERENCE

The disclosure of Japanese Patent Application No. 2016-175082 filed on Sep. 7, 2016 including the specification, drawings and abstract is incorporated herein by reference in its entirety.

BACKGROUND

1. Technical Field

The present disclosure relates to a traveling control device for a vehicle and a vehicle.

2. Description of Related Art

A traveling control device for a vehicle that switches automatic driving by automatic driving control and manual driving by a driver's driving operation is well-known. For example, an automatic driving control device for a vehicle described in Japanese Unexamined Patent Application Publication No. 9-222922 (JP 9-222922 A) is known. JP 9-222922 A discloses a vehicle that can switch automatic driving to perform autonomous traveling by controlling a vehicle speed or a steering angle based on signals from various sensors and manual driving by a driver's driving operation.

SUMMARY

On the other hand, in a vehicle that includes a transmission constituting a part of a power transmission path between a drive power source and drive wheels, the transmission is shifted according to a traveling state. When such a gear shift of the transmission is performed, in a case where switching is made between automatic driving to perform control corresponding to, for example, a peripheral situation of the vehicle and manual driving to perform control in consideration of, for example, a driver's intention, it is considered that control at the time of a gear shift is switched between control for automatic driving and control for manual driving. In this manner, the control at the time of the gear shift is likely to be discontinuous due to switching between the automatic driving and the manual driving, and accordingly, there is a concern that a shock occurs.

The disclosure provides a traveling control device for a vehicle capable of preventing a shock caused by switching between automatic driving and manual driving at the time of a gear shift of a transmission.

A first aspect of the disclosure provides a traveling control device for a vehicle. The vehicle includes a transmission constituting a part of a power transmission path between a drive power source and drive wheels. The traveling control device for a vehicle according to the first aspect of the disclosure includes an electronic control device configured to execute a gear shift of the transmission based on a traveling state, switch automatic driving by automatic driving control and manual driving by a driving operation from a driver, and inhibit switching between the automatic driving and the manual driving until the gear shift of the transmission is completed after the gear shift of the transmission starts.

With this configuration, switching between the automatic driving and the manual driving is inhibited until the gear shift of the transmission is completed after the gear shift starts. The control at the time of the gear shift is avoided from being switched between control for automatic driving and control for manual driving, and discontinuity of control at the time of the gear shift does not occur. Therefore, it is possible to prevent a shock caused by switching between the automatic driving and the manual driving at the time of the gear shift of the transmission.

In the first aspect of the disclosure, the switching inhibition unit may be configured to, when the gear shift of the transmission is executed in a state where a power transmission path for forward traveling is formed, inhibit the switching between the automatic driving and the manual driving until the gear shift of the transmission is completed.

With this configuration, at the time of shifting the transmission in a state in which the power transmission path for forward traveling is formed, switching between the automatic driving and the manual driving is inhibited until the gear shift is completed. Therefore, the control at the time of the gear shift is avoided from being switched between the control for the automatic driving and the control for the manual driving, and discontinuity of control at the time of the gear shift does not occur.

In the first aspect of the disclosure, the switching inhibition unit may be configured to, in a state in which a power transmission path for forward traveling is formed, when a down-shift of the transmission is executed to a state in which an effect of a drive power source brake by using the drive power source is enhanced, inhibit the switching between the automatic driving and the manual driving until the down-shift is completed.

With this configuration, in a state in which the power transmission path for forward traveling is formed, at the time of the down-shift of the transmission to the state in which the effect of the drive power source brake is enhanced switching between the automatic driving and the manual driving is inhibited until the down-shift is completed. Therefore, the control at the time of the down-shift is avoided from being switched between the control for the automatic driving and the control for the manual driving, and discontinuity of control at the time of the down-shift does not occur.

In the first aspect of the disclosure, the switching inhibition unit may be configured to, when forward-reverse movement switching of the transmission in which switching between a state in which a power transmission path for forward traveling is formed and a state in which a power transmission path for reverse traveling is formed is executed, inhibit the switching between the automatic driving and the manual driving until the forward-reverse movement switching is completed.

With this configuration, at the time of forward-reverse movement switching of the transmission for switching between the state in which the power transmission path for forward traveling is formed and the state in which the power transmission path for reverse traveling is formed, switching between the automatic driving and the manual driving is inhibited until forward-reverse movement switching is completed. For this reason, the control at the time of forward-reverse movement switching is avoided from being switched between the control for the automatic driving and the control for the manual driving, and discontinuity of the control at the time of forward-reverse movement switching does not occur.

In the first aspect of the disclosure, the driving control unit may be configured to switch to the manual driving when an emergency requirement that the automatic driving is not performable safely occurs during the automatic driving. The switching inhibition unit may be configured to permit switching from the automatic driving to the manual driving even until a gear shift of the transmission is completed after the gear shift of the transmission starts when switching from the automatic driving to the manual driving is performed with the occurrence of the emergency requirement.

With this configuration, switching from the automatic driving to the manual driving is not inhibited even until the gear shift of the transmission is completed after the gear shift starts when switching from the automatic driving to the manual driving is performed with the occurrence of the emergency requirement. For this reason, in a situation in which the automatic driving is not performable safely, switching from the automatic driving to the manual driving is performed quickly even during the gear shift of the transmission.

In the first aspect of the disclosure, the traveling state may include at least one of a vehicle speed or a requested drive amount of the vehicle.

A second aspect of the disclosure provides a vehicle. The vehicle according to the second aspect of the disclosure includes a transmission constituting a part of a power transmission path between a power source and drive wheels of the vehicle; and an electronic control device configured to execute a gear shift of the transmission based on a traveling state including at least one of a vehicle speed or a requested drive amount of the vehicle, switch automatic driving by automatic driving control and manual driving by a driving operation from a driver, and execute the gear shift of the transmission in a state in which switching between the automatic driving and the manual driving is inhibited until the gear shift of the transmission is completed after the gear shift of the transmission starts.

In the second aspect of the disclosure, the electronic control device may be configured to switch to the manual driving when an emergency requirement that the automatic driving is not performable safely occurs during the automatic driving, and permit switching from the automatic driving to the manual driving even until the gear shift of the transmission is completed after the gear shift of the transmission starts when the switching from the automatic driving to the manual driving is performed with the occurrence of the emergency requirement.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the disclosure will be described in detail referring to the drawings.

Embodiment 1

Figure 1:
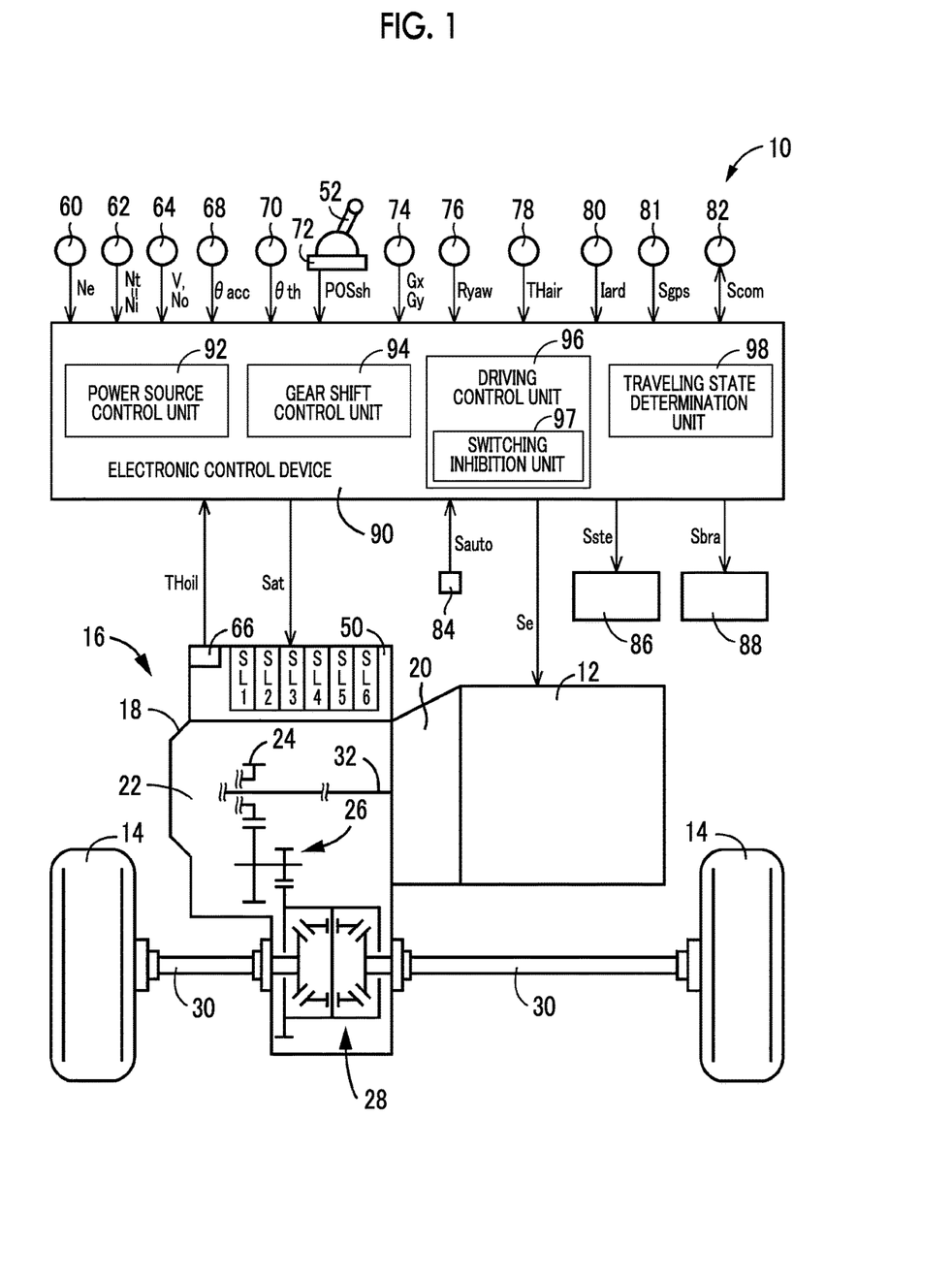
FIG. 1 is a diagram illustrating the schematic configuration of units related to traveling of a vehicle, to which the disclosure is applied, and is a diagram illustrating a main part of a control system that controls the units.

FIG. 1 is a diagram illustrating the schematic configuration of units related to traveling of a vehicle 10, to which the disclosure is applied. Furthermore, FIG. 1 is a diagram illustrating a main part of a control system that controls the units. In FIG. 1, the vehicle 10 includes an engine 12, drive wheels 14, and a power transmission device 16 provided in a power transmission path between the engine 12 and the drive wheels 14. The power transmission device 16 includes, in a case 18 as a non-rotating member attached to a vehicle body, a torque converter 20, automatic transmission 22, a reduction gear mechanism 26 coupled to a transmission output gear 24 as an output rotating member of the automatic transmission 22, a differential gear (differential gear device) 28 coupled to the reduction gear mechanism 26, and the like. The power transmission device 16 includes a pair of drive shafts (axle) 30 coupled to the differential gear 28, and the like. In the power transmission device 16, power (in a case where there is no need for particular distinction, torque or force has the same meaning) output from the engine 12 is transmitted to the drive wheels 14 through the torque converter 20, the automatic transmission 22, the reduction gear mechanism 26, the differential gear 28, the drive shafts 30, and the like in this order.

The engine 12 is a drive power source (a power source has the same meaning) of the vehicle 10, and is a known internal combustion engine, such as a gasoline engine or a diesel engine. Operation states, such as an intake air amount, a fuel supply amount, and an ignition timing, are controlled by an electronic control device 90 described below, whereby engine torque Te of the engine 12 is controlled.

Figure 2:
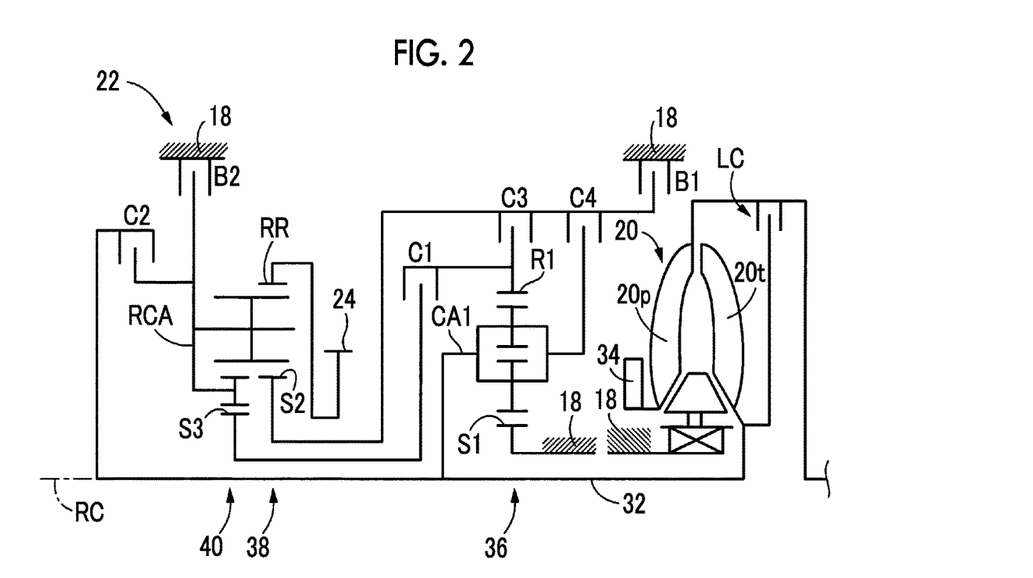
FIG. 2 is a schematic view illustrating an example of a torque converter or an automatic transmission.

FIG. 2 is a schematic view illustrating an example of the torque converter 20 or the automatic transmission 22. The torque converter 20, the automatic transmission 22, or the like is constituted substantially symmetrically with respect to an axis RC of a transmission input shaft 32 as an input rotating member of the automatic transmission 22, and in FIG. 2, lower half portions from the axis RC are omitted.

In FIG. 2, the torque converter 20 is provided to rotate around the axis RC in a power transmission path between the engine 12 and the automatic transmission 22. The torque converter 20 is a fluid type power transmission device that includes a pump impeller 20$p$ coupled to the engine 12, a turbine runner 20$t$ coupled to the transmission input shaft 32, and the like. The transmission input shaft 32 is a turbine shaft that is rotationally driven by the turbine runner 20*t*. The power transmission device 16 includes a lockup clutch LC that can directly couple the pump impeller 20*p* and the turbine runner 20*t* (that is, the input and output rotating members of the torque converter 20). The power transmission device 16 is a mechanical oil pump 34 coupled to the pump impeller 20*p*. The oil pump 34 is rotationally driven by the engine 12, and ejects hydraulic oil for using in gear shift control of the automatic transmission 22 or supplying lubricant oil to the units of the power transmission device 16. That is, hydraulic oil pumped by the oil pump 34 is supplied as source pressure of a hydraulic control circuit 50 (see FIG. 1) provided in the vehicle 10.

The automatic transmission 22 is a stepped transmission that constitutes a part of the power transmission path between the engine 12 and the drive wheels 14. The automatic transmission 22 is a planetary gear type multistage transmission that has a plurality of sets of planetary gear devices and a plurality of engagement devices. Specifically, the automatic transmission 22 has a double-pinion type first planetary gear device 36, a single-pinion type second planetary gear device 38 constituted of a Ravigneaux type, and a double-pinion type third planetary gear device 40 on the same axis (on the axis RC). The automatic transmission 22 has a plurality of engagement devices (hereinafter, in a case where there is no need for particular distinction, simply referred to as engagement devices C) including a first clutch C1, a second clutch C2, a third clutch C3, a fourth clutch C4, a first brake B1, and a second brake B2.

The engagement devices C are hydraulic frictional engagement devices constituted of a wet type multi-plate clutch or brake that is pressed by a hydraulic actuator, a band brake that is tightened by a hydraulic actuator, or the like. The torque capacities (clutch torque) Tc (that is, clutch torque Tc1, Tc2, Tc3, Tc4, Tb1, Tb2) of the engagement devices C are changed by hydraulic pressure (clutch pressure) Pc (that is, clutch pressure Pc1, Pc2, Pc3, Pc4, Pb1, Pb2) output from solenoid valves SL1 to SL6 or the like in the hydraulic control circuit 50, whereby the operation states (engagement state, release state, and the like) of the engagement devices C are switched.

In the automatic transmission 22, part of rotating elements (sun gears S1, S2, S3, carriers CAL RCA, and ring gears R1, RR) of the first planetary gear device 36, the second planetary gear device 38, and the third planetary gear device 40 is coupled to each other directly or indirectly (or selectively) through the engagement devices C. The rotating elements are couple to the transmission input shaft 32, the case 18, or the transmission output gear 24.

In the automatic transmission 22, the operation states of the engagement devices C are controlled by the electronic control device 90 described below according to a driver's acceleration operation (accelerator operation), a vehicle speed V, or the like (that is, predetermined engagement devices among the engagement devices C are engaged), a plurality of gear stages (gear shift stages) with different gear ratios (gear shift ratios) γ(=AT input rotation speed Ni/AT output rotation speed No) is selectively formed. In the automatic transmission 22, for example, as shown in an operation chart of FIG. 3, gear stages including eight forward gear stages of a first gear stage "1st" to an eighth gear stage "8th" and one reverse gear stage "Rev" gear stage are selectively formed. The AT input rotation speed Ni is a rotation speed of the transmission input shaft 32, and the AT output rotation speed No is a rotation speed of the transmission output gear 24. The gear ratio γ automatic transmission 22 corresponding to each gear stage is appropriately determined by ρ1, ρ2, ρ3 as gear ratios (=the number of teeth of the sun gear/the number of teeth of the ring gear) of the first planetary gear device 36, the second planetary gear device 38, and the third planetary gear device 40. The gear ratio γ is the largest in the first gear stage "1st" and decreases toward a high vehicle speed side (eighth gear stage "8th").

Figure 3:
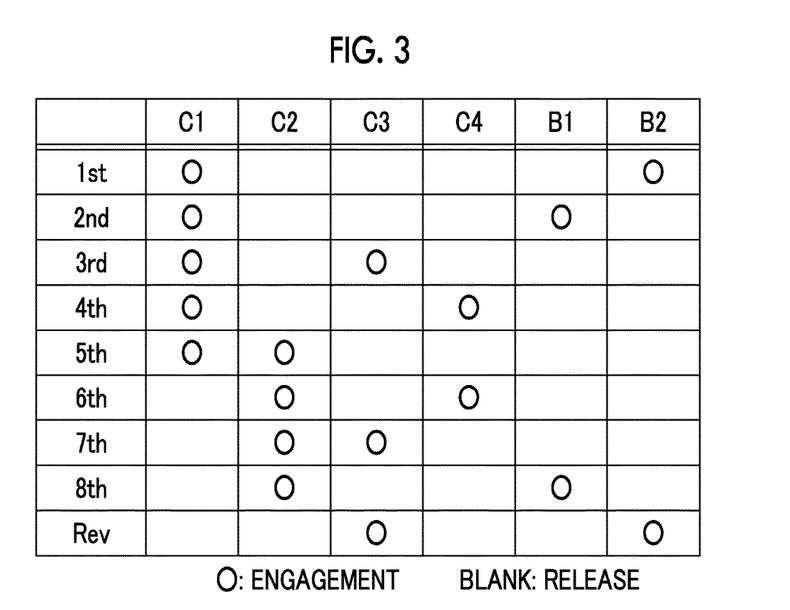
FIG. 3 is an operation chart illustrating the relationship between a gear shift operation of the automatic transmission and a combination of operations of engagement devices used for the gear shift operation.

The engagement operation chart of the FIG. 3 contains the relationship between the gear stages formed in the automatic transmission 22 and the engagement devices C, "○" represents engagement, and a blank represents release. As shown in FIG. 3, predetermined engagement devices among the engagement devices C are engaged, whereby the gear stages of the eight forward gear stages ("1st" to "8th") and one reverse gear stage "Rev" are selectively formed. For example, the first gear stage "1st" is formed when the first clutch C1 and the second brake B2 as the predetermined engagement devices are engaged. All of the engagement devices C are released, whereby the automatic transmission 22 is brought into a neutral state (that is, a neutral state in which power transmission is shut off) in which any gear stage is not formed.

Returning to FIG. 1, the vehicle 10 further includes the electronic control device 90 including a traveling control device configured to control the units related to traveling. The electronic control device 90 includes a so-called microcomputer including, for example, a CPU, a RAM, a ROM, an input/output interface, and the like. The CPU executes various kinds of control of the vehicle 10 by performing signal processing according to a program stored in the ROM in advance while using a temporary storage function of the RAM. For example, the electronic control device 90 is configured to execute output control of the engine 12, gear shift control of the automatic transmission 22, and the like, and includes computers for engine control, hydraulic control (for gear shift control), and the like as necessary.

Various signals and the like (for example, an engine rotation speed Ne, the AT input rotation speed Ni as a rotation speed (that is, a turbine rotation speed Nt) of the turbine shaft, the AT output rotation speed No corresponding to the vehicle speed V, a hydraulic oil temperature THoil as a temperature of hydraulic oil in the hydraulic control circuit 50, an accelerator operation amount θacc as an acceleration operation amount (that is, an accelerator operation amount) of a driver representing the magnitude of an acceleration operation of the driver, a throttle valve opening degree θth as an opening degree of an electronic throttle valve, an operation position POSsh of a shift lever 52 as a shift operation member provided in the vehicle 10, a front-rear acceleration Gx of the vehicle 10, a right-left acceleration Gy of the vehicle 10, a yaw rate Ryaw as a rotational angular velocity around the vertical axis of the vehicle 10, an outside air temperature THair around the vehicle 10, vehicle periphery information Iard, a GPS signal (orbit signal) Sgps, a communication signal Scom, an automatic driving selection signal Sauto, and the like) based on detection values of various sensors and the like (for example, an engine rotation speed sensor 60, an input rotation speed sensor 62, an output rotation speed sensor 64, an oil temperature sensor 66, an accelerator operation amount sensor 68, a throttle valve opening degree sensor 70, a shift operation position sensor 72, a G sensor 74, a yaw rate sensor 76, an outside air temperature sensor 78, a course recognition and obstacle detection sensor 80, such as an in-vehicle camera, a GPS antenna 81, an external network communication antenna 82, an automatic driving selection switch 84 that is used when the driver selects automatic driving, and the like) provided in the vehicle 10 are supplied to the electronic control device 90. Various command signals (for example, an engine control command signal Se for controlling the engine 12, a hydraulic control command signal Sat for controlling the operation states of the engagement devices C (that is, for controlling a gear shift of the automatic transmission 22), a communication signal Scom, a steering signal Sste for operating a steering actuator 86 controlling steering of wheels (in particular, front wheels), a braking signal Sbra for operating a brake actuator 88 controlling a foot brake, and the like) are output from the electronic control device 90 to the devices (for example, the engine 12, the hydraulic control circuit 50, the external network communication antenna 82, the steering actuator 86, the brake actuator 88, and the like) provided in the vehicle 10. The hydraulic control command signal Sat is a command signal (hydraulic pressure command value or instruction pressure) for driving the solenoid valves SL1 to SL6 regulating the clutch pressure Pc supplied to the hydraulic actuators of the engagement devices C, and is output to the hydraulic control circuit 50.

The operation position POSsh of the shift lever 52 is, for example, an operation position "P", "R", "N", "D", "B", or the like. In the operation position "P", a parking position (P position) of the automatic transmission 22 is selected and the automatic transmission 22 is brought into a neutral state in which the power transmission path is shut off. The neutral state is a neutral state in which power transmission in the power transmission path between the engine 12 and the drive wheels 14 is impossible with the release of the engagement devices C. The operation position "P" is a parking operation position P (hereinafter, referred to as a P operation position) where the rotation of the transmission output gear 24 is mechanically inhibited (locked). The operation position "R" is a reverse traveling operation position R (hereinafter, referred to as an R operation position) where a reverse traveling position (R position) of the automatic transmission 22 is selected to enable reverse traveling. In the R operation position, the power transmission path between the engine 12 and drive wheels 14 is brought into a power transmittable state in which a power transmission path for reverse traveling is formed with the engagement of the engagement devices C forming the reverse gear stage of the automatic transmission 22. The R operation position is a traveling operation position where reverse traveling is enabled using the reverse gear stage "Rev" of the automatic transmission 22. The operation position "N" is a neutral operation position N (hereinafter, referred to as an N operation position) where a neutral position (N position) of the automatic transmission 22 is selected and the automatic transmission 22 is brought into the neutral state. The P operation position and the N operation position are non-traveling operation positions where traveling with the power of the engine 12 is disabled. The operation position "D" is a forward traveling operation position D (hereinafter, referred to as a D operation position) where a forward traveling position (D position) of the automatic transmission 22 is selected to enable forward traveling. In the D operation position, the power transmission path between the engine 12 and the drive wheels 14 is brought into a power transmittable state in which a power transmission path for forward traveling is formed with the engagement of the engagement devices C forming the forward gear stage of the automatic transmission 22. The D operation position is a gear shift range (D range) in which a gear shift of the automatic transmission 22 is permitted. The D operation position is a traveling operation position where automatic gear shift control is executed using all forward gear stages of the first gear stage "1st" to the eighth gear stage "8th" to enable forward traveling. In the operation position "B", an engine brake position (B position) of the automatic transmission 22 is selected. The operation position "B" is an engine brake operation position B (hereinafter, referred to as a B operation position) where the automatic transmission 22 is brought into a state in which an engine brake as a drive power source brake using the engine 12 is easily applied (that is, a state in which the effect of the engine brake is enhanced") compared to the D position in the power transmittable state in which the power transmission path for forward traveling is formed. For example, in the B operation position, a gear stage on a lower vehicle speed (lower side) than the D operation position by one gear (or two or more gears) is formed in the automatic transmission 22. Accordingly, in a case where the shift lever 52 is switched from the D operation position to the B operation position (that is, is operated for D→B switching), a request for switching from the D position to the B position (a request for D→B position switching) is made to the automatic transmission 22, and the automatic transmission 22 is downshifted. In this way, the shift lever 52 is artificially operated to function as a switching operation member that receives a request for switching the shift position of the automatic transmission 22.

In order to realize a control function for various kinds of control in the vehicle 10, the electronic control device 90 includes power source control means, that is, a power source control unit 92, gear shift control means, that is, a gear shift control unit 94, and driving control means, that is, a driving control unit 96.

The power source control unit 92 calculates requested drive power Fdem by applying the accelerator operation amount eacc and the vehicle speed V (the AT output rotation speed No or the like has the same meaning) to a relationship (for example, a drive power map) determined and stored experimentally or in design in advance (that is, defined in advance), for example. The power source control unit 92 sets target engine torque Tetgt providing the requested drive power Fdem in consideration of transmission loss, an accessory load, the gear ratio γ of the automatic transmission 22, and the like. The power source control unit 92 outputs the engine control command signal Se for performing the output control of the engine 12 to a throttle actuator, a fuel injection device, an ignition device, and the like such that the target engine torque Tetgt is obtained.

The gear shift control unit 94 shifts the automatic transmission 22 according to a traveling state. Specifically, when the operation position POSsh of the shift lever 52 is the D operation position, the gear shift control unit 94 determines whether or not to execute a gear shift of the automatic transmission 22 by determining the presence or absence of the execution of the switching control of the gear stages of the automatic transmission 22 using, for example, a relationship (gear shift map, gear shift diagram) defined in advance. The gear shift control unit 94 determines whether or not to execute a gear shift of the automatic transmission 22 (that is, determines a gear stage that is formed in the automatic transmission 22) by applying a vehicle speed related value and a requested drive amount to the above-described gear shift map. The gear shift control unit 94 outputs a gear shift command for engaging and/or releasing the engagement devices C involved in the gear shift of the automatic transmission 22 as the hydraulic control command signal Sat to the hydraulic control circuit 50 such that the determined gear stage is formed.

The above-described gear shift map is a predetermined relationship having gear shift lines for determining a gear shift of the automatic transmission 22 on two-dimensional coordinates with the vehicle speed related value and the requested drive amount as variables. The gear shift lines in the gear shift map are an up line for determining an up-shift and a down line for determining a down-shift. Each of the up line and the down line is defined in advance between adjacent gear stages to each other in a plurality of gear stages. Each gear shift line is for determining whether or not an actual vehicle speed related value on a line indicating a certain requested drive amount crosses the line or whether or not an actual requested drive amount on a line indicating a certain vehicle speed related value crosses the line, that is, whether or not the actual vehicle speed related value or the actual requested drive amount crosses a value (gear shift point) at which a gear shift on the gear shift line should be executed, and is defined in advance as a series of gear shift points. The above-described vehicle speed related value is the vehicle speed V or a value related to the vehicle speed V, and is, for example, the vehicle speed V, a wheel speed, the AT output rotation speed No, or the like. The above-described requested drive amount is a value representing the magnitude of a driver's drive request to the vehicle 10, and is, for example, the above-described requested drive power Fdem [N], requested drive torque [Nm] or requested drive power [W] related to the requested drive power Fdem, or the like. As the requested drive amount, the accelerator operation amount θacc [%], the throttle valve opening degree θth [%], an intake air amount [g/sec], or the like may be used.

In a case of a gear shift of the automatic transmission 22, the gear shift control unit 94 performs a so-called clutch-to-clutch gear shift for switching engagement devices involved in the gear shift of the automatic transmission 22 as the predetermined engagement devices among the engagement devices C (that is, switching the engagement and the release of the predetermined engagement devices). For example, in a 3→2 down-shift from the third gear stage "3rd" to the second gear stage "2nd", switching is performed with the third clutch C3 and the first brake B1 (that is, a clutch-to-clutch gear shift for releasing the third clutch C3 and engaging the first brake B1 is executed).

When the operation position POSsh of the shift lever 52 is the R operation position, the gear shift control unit 94 outputs a command for engaging both of the third clutch C3 and the second brake B2 as the hydraulic control command signal Sat to the hydraulic control circuit 50 such that the reverse gear stage "Rev" is formed. Accordingly, when the shift lever 52 is switched between the D operation position and the R operation position (that is, is operated for D→R switching or R→D switching), the gear shift control unit 94 outputs the hydraulic control command signal Sat for shifting the automatic transmission 22 to the hydraulic control circuit 50 such that switching is performed between the forward gear stage (in particular, the first gear stage "1st") and the reverse gear stage "Rev", that is, switching is performed between the state (that is, the D position of the automatic transmission 22) in which the power transmission path for forward traveling is formed and the state (that is, the R position of the automatic transmission 22) in which the power transmission path for reverse traveling is formed.

When the shift lever 52 is operated for D→B switching, the gear shift control unit 94 outputs the hydraulic control command signal Sat for down-shifting the automatic transmission 22 to a state, in which the effect of the engine brake is enhanced in at the time of the D position of the automatic transmission 22, to the hydraulic control circuit 50.

When there is a request for switching the shift position or the gear stage of the automatic transmission 22 during the automatic driving by the driving control unit 96, the gear shift control unit 94 outputs the hydraulic control command signal Sat for shifting the automatic transmission 22 to the hydraulic control circuit 50 such that the shift position or the gear stage requested by the switching request is formed.

The driving control unit 96 switches automatic driving by automatic driving control and manual driving by a driver's driving operation. The manual driving is a driving method in which traveling of the vehicle 10 is performed by the driver's driving operation, such as an accelerator operation, a brake operation, or a steering operation. The automatic driving is a driving method in which traveling of the vehicle 10 is performed by automatically performing acceleration/deceleration, braking, steering, or the like through the control of the electronic control device 90 based on the signals, information, and the like from various sensors without depending on a driver's driving operation (intention).

Specifically, the driving control unit 96 executes the manual driving in a case where the automatic driving is not selected by the automatic driving selection switch 84. The driving control unit 96 executes the automatic driving in a case where the automatic driving selection switch 84 is operated by the driver and the automatic driving is selected. The driving control unit 96 performs switching to the manual driving in a case where determination is made that the driver's driving operation, such as an accelerator operation, a brake operation, or a steering operation, is performed during the automatic driving. The driving control unit 96 performs switching to the manual driving in a case where determination is made that an emergency requirement occurs during the automatic driving. The emergency requirement is a situation in which the automatic driving is not performable safely due to, for example, an abnormality in communication necessary for the automatic driving, such as hacking (unauthorized access to the electronic control device 90 through a communication line) or a transmission/reception error of the communication signal Scom. The driving control unit 96 performs switching to the manual driving in a case where determination is made that the execution of the automatic driving is impossible based on a road situation during the automatic driving. The driving control unit 96 performs switching to the automatic driving in a case where determination is made that return to the automatic driving is possible based on a road situation when switching to the manual driving is temporarily performed based on the road situation during the automatic driving. The driving control unit 96 inhibits switching to the automatic driving and maintains the manual driving in a case where the automatic driving selection switch 84 is operated by the driver and the automatic driving is selected in a state in which determination is made that an emergency requirement occurs during the manual driving.

The driving control unit 96 outputs a command for controlling the engine 12 or the automatic transmission 22 to the power source control unit 92 and the gear shift control unit 94 based on the signals, information, and the like from various sensors, and perform the automatic driving by operating the steering actuator 86 or the brake actuator 88.

On the other hand, in the automatic driving, for example, driving of the vehicle 10 is performed through control corresponding to a peripheral situation of the vehicle 10. In the manual driving, driving of the vehicle 10 is performed through control in consideration of, for example, a driver's intention. For this reason, it is considered that control at the time of shifting the automatic transmission 22 is performed through control (gear shift control) for the automatic driving during the automatic driving, and is performed through control (gear shift control) for the manual driving during the manual driving. For example, during the automatic driving, a gear shift time for a gear shift of the automatic transmission 22 is made comparatively long, thereby performing gear shift control focusing suppression of a shock. During the manual driving, a gear shift time for a gear shift of the automatic transmission 22 is made comparatively short, thereby performing gear shift control focusing on a driver's acceleration intention or deceleration intention. In a case of performing such gear shift control, when a gear shift of the automatic transmission 22 is performed, in a case where switching between the automatic driving and the manual driving is made, the control (for example, control of the gear shift time, and consequently, control of drive torque during a period of transition of the gear shift or control of timing of realizing target drive torque) at the time of the gear shift is likely to be switched between the control for the automatic driving and the control for the manual driving and discontinuous, and as a result, there is a concern that a shock occurs.

Accordingly, in order to prevent a shock caused by switching between the automatic driving and the manual driving at the time of a gear shift of the automatic transmission 22, the driving control unit 96 functionally includes a switching inhibition unit 97 that inhibits switching between the automatic driving and the manual driving until the gear shift of the automatic transmission 22 is completed after the gear shift starts.

The electronic control device 90 further includes traveling state determination means, that is, a traveling state determination unit 98 in order to realize control for preventing a shock caused by switching between the automatic driving and the manual driving at the time of the gear shift of the automatic transmission 22.

The traveling state determination unit 98 determines whether or not it is the time at which switching between the automatic driving and the manual driving is performed, that is, whether or not there is a request for switching between the automatic driving and the manual driving. Switching between the automatic driving and the manual driving is switching from the automatic driving to the manual driving or switching from the manual driving to the automatic driving. That is, the request for switching between the automatic driving and the manual driving is a request for switching from the automatic driving to the manual driving or a request for switching from the manual driving to the automatic driving.

The traveling state determination unit 98 determines whether or not it is the time of a gear shift (that is, switching of the gear stages) of the automatic transmission 22 by the gear shift control unit 94, that is, whether or not there is a request for a gear shift to the automatic transmission 22. The time of the gear shift of the automatic transmission 22 by the gear shift control unit 94 is, for example, the time of a gear shift of the automatic transmission 22 in the D position of the automatic transmission 22. That is, the request for gear shift to the automatic transmission 22 is, for example, a request for switching of the gear stages in the D position of the automatic transmission 22.

The traveling state determination unit 98 determines whether or not the gear shift of the automatic transmission 22 is completed (that is, whether or not switching of the gear stages is completed). At the time of the gear shift of the automatic transmission 22 in the D position (that is, when there is the request for switching of the gear stages in the D position of the automatic transmission 22), engagement/release control for outputting the hydraulic control command signal Sat for switching the operation states of the engagement devices C to be switched with the gear shift of the automatic transmission 22 to the engagement devices C is executed. With this, the operation states of the engagement devices C are switched. For this reason, the start of the gear shift of the automatic transmission 22 may be determined according to, for example, the start of the engagement/release control of the engagement devices C (that is, the start of switching of the operation states of the engagement devices C) with the start of the output of the hydraulic control command signal Sat. The completion of the gear shift of the automatic transmission 22 may be determined according to, for example, the completion (end) of the engagement/release control of the engagement devices C (that is, the completion of switching of the operation states of the engagement devices C) with the end of the output of the hydraulic control command signal Sat. The traveling state determination unit 98 determines whether or not the gear shift of the automatic transmission 22 is completed based on, for example, whether or not the engagement/release control of the engagement devices C ends. The traveling state determination unit 98 determines whether or not the engagement/release control of the engagement devices C ends according to, for example, whether or not the output of the hydraulic control command signal Sat ends.

In a case where the gear shift of the automatic transmission 22 is completed, the engine rotation speed Ne (or the AT input rotation speed Ni) becomes a synchronous rotation speed after the gear shift. For this reason, the completion of the gear shift of the automatic transmission 22 may be determined according to, for example, whether or not the AT input rotation speed Ni becomes the synchronous rotation speed (=gear ratio γ the gear shift×AT output rotation speed No). The traveling state determination unit 98 determines whether or not the gear shift of the automatic transmission 22 is completed based on, for example, whether or not the AT input rotation speed Ni becomes the synchronous rotation speed after the gear shift.

During a period of transition of the gear shift of the automatic transmission 22 in the D position, in a case where executing torque-down control of the engine 12 for suppressing a gear shift shock, the completion of the gear shift of the automatic transmission 22 may be determined according to whether or not the torque-down control ends. That is, the completion of the gear shift of the automatic transmission 22 may be determined according to whether or not the engine torque Te (or the engine control command signal Se to the engine 12) is returned to a value of target engine torque Tetgt. The traveling state determination unit 98 may determine whether or not the gear shift of the automatic transmission 22 is completed according to, for example, the end of the torque-down control. That is, determination may be made whether or not the gear shift of the automatic transmission 22 is completed based on whether or not the engine torque Te (or the engine control command signal Se to the engine 12) is returned to the value of the target engine torque Tetgt. Determination regarding whether or not the engine torque Te is returned to the value of the target engine torque Tetgt is determination regarding whether or not the drive torque reaches the target drive torque after the gear shift.

The switching inhibition unit 97 inhibits switching between the automatic driving and the manual driving in a case where the traveling state determination unit 98 determines that the gear shift of the automatic transmission 22 is not completed when the traveling state determination unit 98 determines that there is the request for switching between the automatic driving and the manual driving and the traveling state determination unit 98 determines that there is the request for the gear shift to the automatic transmission 22 (for example, the request for switching of the gear stages in the D position of the automatic transmission 22). That is, the switching inhibition unit 97 inhibits switching between the automatic driving and the manual driving until the traveling state determination unit 98 determines that the gear shift of the automatic transmission 22 is completed when the traveling state determination unit 98 determines that there is the request for switching between the automatic driving and the manual driving and the traveling state determination unit 98 determines that there is the request for switching of the gear stages in the D position of the automatic transmission 22. The driving control unit 96 executes switching between the automatic driving and the manual driving in a case where the traveling state determination unit 98 determines that the gear shift of the automatic transmission 22 is completed when the traveling state determination unit 98 determines that there is the request for switching between the automatic driving and the manual driving and the traveling state determination unit 98 determines that there is the request for switching of the gear stages in the D position of the automatic transmission 22. The driving control unit 96 executes switching between the automatic driving and the manual driving in a case where the traveling state determination unit 98 determines that there is no request for switching of the gear stages in the D position of the automatic transmission 22 when the traveling state determination unit 98 determines that there is the request for switching between the automatic driving and the manual driving.

Figure 4:
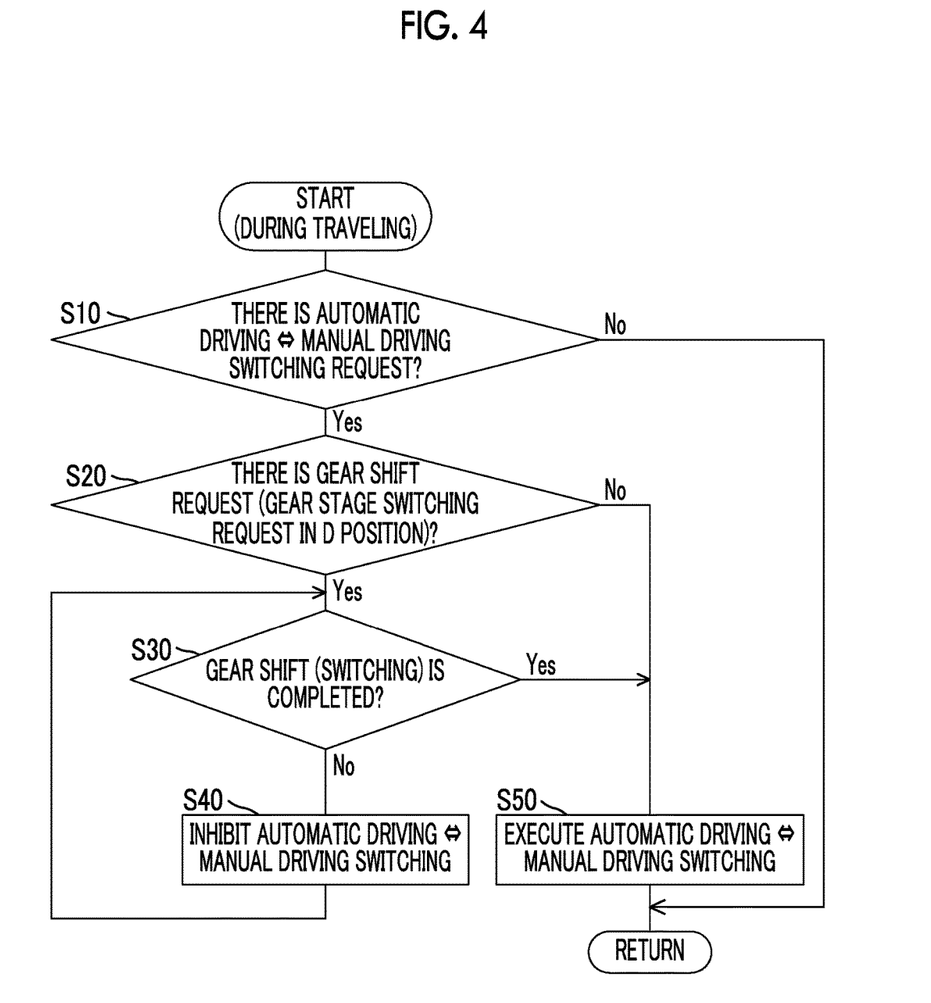
FIG. 4 is a flowchart illustrating a main part of control operation of an electronic control device, that is, control operation for preventing a shock caused by switching between automatic driving and manual driving at the time of a gear shift of the automatic transmission.

FIG. 4 is a flowchart illustrating a main part of control operation of the electronic control device 90, that is, control operation for preventing a shock caused by switching between automatic driving and manual driving at the time of a gear shift of the automatic transmission 22, and the flowchart is repeatedly executed during traveling, for example.

In FIG. 4, first, in Step (hereinafter, Step will be omitted) S10 corresponding to the function of the traveling state determination unit 98, determination is made whether or not there is the request for switching between the automatic driving and the manual driving. In a case where the determination of S10 is negative, the routine ends. In a case where the determination of S10 is affirmative, in S20 corresponding to the function of the traveling state determination unit 98, determination is made whether or not there is the request for the gear shift to the automatic transmission 22 (the request for switching of the gear stages in the D position). In a case whether or not the determination of S20 is affirmative, in S30 corresponding to the function of the traveling state determination unit 98, determination is made whether or not the gear shift (switching of the gear stages) of the automatic transmission 22 is completed. In a case where the determination of S30 is negative, in S40 corresponding to the function of the switching inhibition unit 97, switching between the automatic driving and the manual driving is inhibited. Next to S40, S30 is executed. In a case where the determination of S20 is negative or in a case where the determination of S30 is affirmative, in S50 corresponding to the function of the driving control unit 96, switching between the automatic driving and the manual driving is executed.

As described above, with this embodiment, switching between the automatic driving and the manual driving is inhibited until the gear shift of the automatic transmission 22 is completed after the gear shift starts. Therefore, the control at the time of the gear shift is avoided from being switched between the control for the automatic driving and the control for the manual driving, and discontinuity of control at the time of the gear shift does not occur. As a result, it is possible to prevent a shock caused by switching between the automatic driving and the manual driving at the time of the gear shift of the automatic transmission 22.

With this embodiment, at the time of the gear shift of the automatic transmission 22 in the D position, switching between the automatic driving and the manual driving is inhibited until the gear shift is completed. Therefore, the control at the time of the gear shift is avoided from being switched between the control for the automatic driving and the control for the manual driving, and discontinuity of control at the time of the gear shift does not occur.

Embodiment 2

Next, another embodiment of the disclosure will be described. In the following description, portions common to the embodiments are represented by the same reference numerals, and description thereof will not be repeated.

In Embodiment 1 described above, a case where the time of the gear shift of the automatic transmission 22 by the gear shift control unit 94 is the time of the gear shift of the automatic transmission 22 in the D position of the automatic transmission 22 has been illustrated. In this embodiment, a case where the time of the gear shift of the automatic transmission 22 is time of a down-shift of the automatic transmission 22 to a state in which the effect of the engine brake is enhanced at the time of the D position of the automatic transmission 22 is illustrated. That is, a case where the request for the gear shift to the automatic transmission 22 is a request for D→B position switching to the automatic transmission 22 is illustrated.

During the manual driving, when there is the request for D→B position switching, as shown in Embodiment 1 described above, it is assumed that the shift lever 52 is operated for D→B switching. During the automatic driving, when there is the request for D→B position switching, for example, it is assumed that traveling, such as traveling on a downhill slope, in which the engine brake should be operated, is performed.

D→B position switching is a down-shift (that is, switching to a low gear stage) of the automatic transmission 22, similarly to when there is the request for switching of the gear stages in the D position of the automatic transmission 22, the gear shift of the automatic transmission 22 is executed. Accordingly, at the time of the down-shift of the automatic transmission 22 to the state in which the effect of the engine brake is enhanced at the time of the D position of the automatic transmission 22 (that is, when there is the request for D→B position switching to the automatic transmission 22), the engagement/release control for outputting the hydraulic control command signal Sat for switching the operation states of the engagement devices C to be switched with the down-shift (gear shift) of the automatic transmission 22 to the engagement devices is executed and the operation states of the engagement devices C are switched. For this reason, the completion of the down-shift (in this case, D→B position switching) of the automatic transmission 22 may be determined according to, for example, the completion of the engagement/release control of the engagement devices C. The traveling state determination unit 98 determines whether or not the down-shift of the automatic transmission 22 is completed based on, for example, whether or not the engagement/release control of the engagement devices C ends.

In a case where the down-shift of the automatic transmission 22 is completed, the engine rotation speed Ne (or the AT input rotation speed Ni) increases to the synchronous rotation speed after the gear shift. For this reason, the completion of the down-shift of the automatic transmission 22 may be determined according to, for example, whether or not the AT input rotation speed Ni becomes the synchronous rotation speed (=gear ratio γ after down-shift×AT output rotation speed No) after the down-shift. The traveling state determination unit 98 determines whether or not the down-shift of the automatic transmission 22 is completed based on, for example, whether or not the AT input rotation speed Ni is equal to or higher than a target rotation speed capable of determining that the AT input rotation speed Ni becomes the synchronous rotation speed after the down-shift.

The switching inhibition unit 97 inhibits switching between the automatic driving and the manual driving in a case where the traveling state determination unit 98 determines that the down-shift (D→B position switching) of the automatic transmission 22 is not completed when the traveling state determination unit 98 determines that there is the request for switching between the automatic driving and the manual driving and the traveling state determination unit 98 determines that there is the request for the gear shift to the automatic transmission 22 (for example, the request for D→B position switching to the automatic transmission 22). That is, the switching inhibition unit 97 inhibits switching between the automatic driving and the manual driving until the traveling state determination unit 98 determines that the down-shift of the automatic transmission 22 is completed in a case where the traveling state determination unit 98 determines that there is the request for D→B position switching to the automatic transmission 22 when the traveling state determination unit 98 determines that there is the request for switching between the automatic driving and the manual driving. The driving control unit 96 executes switching between the automatic driving and the manual driving in a case where the traveling state determination unit 98 determines that the down-shift of the automatic transmission 22 is completed when the traveling state determination unit 98 determines that there is the request for switching between the automatic driving and the manual driving and the traveling state determination unit 98 determines that there is the request for D→B position switching to the automatic transmission 22. The driving control unit 96 executes switching between the automatic driving and the manual driving in a case where the traveling state determination unit 98 determines that there is no request for D→B position switching to the automatic transmission 22 when the traveling state determination unit 98 determines that there is the request for switching between the automatic driving and the manual driving.

Figure 5:
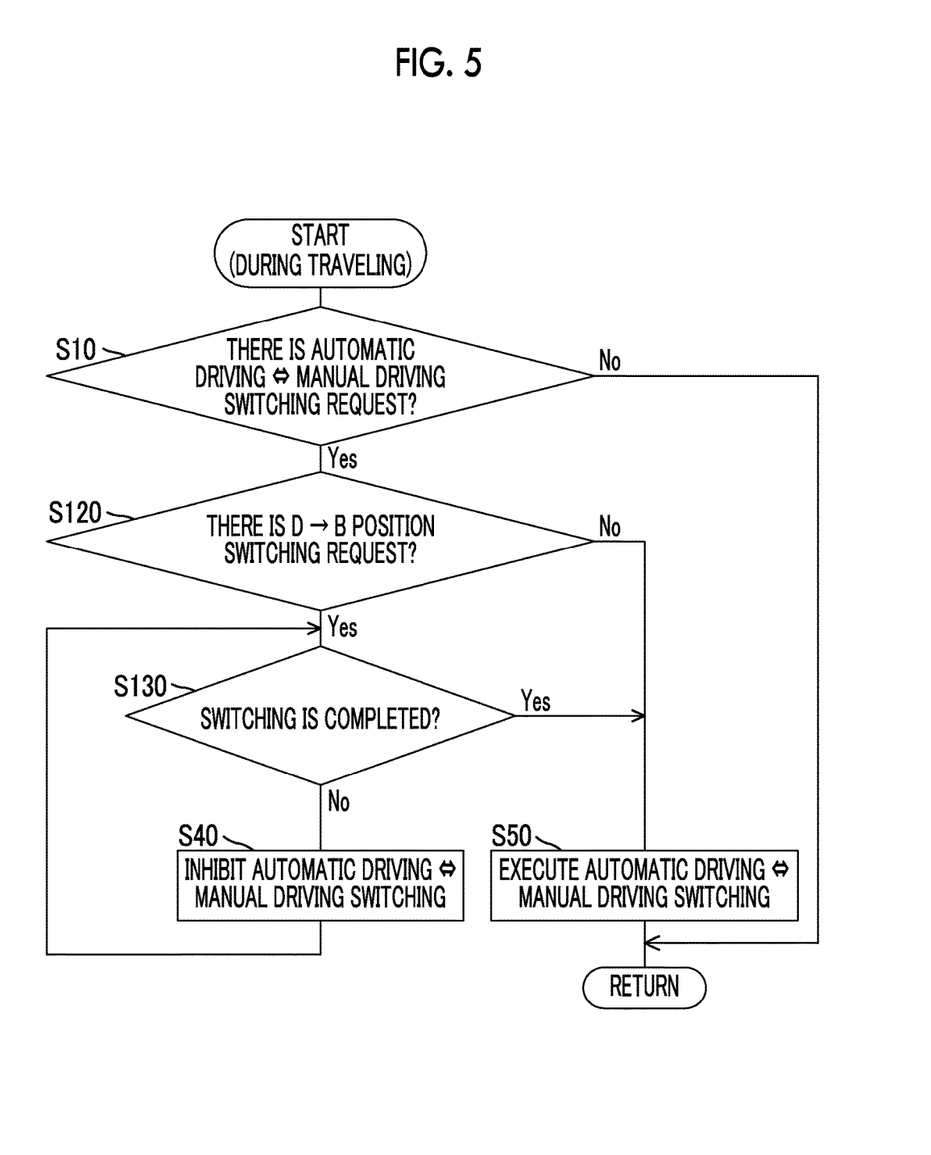
FIG. 5 is a flowchart illustrating a main part of control operation of an electronic control device, that is, control operation for preventing a shock caused by switching between automatic driving and manual driving at the time of a gear shift of the automatic transmission, and shows an embodiment different from FIG. 4.

FIG. 5 is a flowchart illustrating a main part of control operation of the electronic control device 90, that is, control operation for preventing a shock caused by switching between automatic driving and manual driving at the time of a gear shift of the automatic transmission 22, and the flowchart is repeatedly executed during traveling, for example. FIG. 5 shows an embodiment different from FIG. 4.

The flowchart of FIG. 5 is different from the flowchart of FIG. 4 in that the steps of S20 and S30 of FIG. 4 are substituted with steps of S120 and S130, respectively. The difference will be primarily described. In FIG. 5, in a case where the determination of S10 is affirmative, in S120 corresponding to the function of the traveling state determination unit 98, determination is made whether or not there is the request for D→B position switching to the automatic transmission 22. In a case where the determination of S120 is affirmative, in S130 corresponding to the function of the traveling state determination unit 98, determination is made whether or not the down-shift (D→B position switching) of the automatic transmission 22 is completed. In a case where the determination of S130 is negative, S40 is executed. Next to S40, S130 is executed. In a case where the determination of S120 is negative or in a case where the determination of S130 is affirmative, S50 is executed.

As described above, with this embodiment, at the time of the down-shift of the automatic transmission 22 to the state in which the effect of the engine brake is enhanced at the time of the D position of the automatic transmission 22, switching between the automatic driving and the manual driving is inhibit until the down-shift is completed. Therefore, the control at the time of the down-shift is avoided from being switched between the control for the automatic driving and the control for the manual driving, and discontinuity of control at the time of the down-shift does not occur. As a result, as in Embodiment 1 described above, it is possible to prevent a shock caused by switching between the automatic driving and the manual driving at the time of the gear shift of the automatic transmission 22.

Embodiment 3

In Embodiment 1 described above, a case where the time of the gear shift of the automatic transmission 22 by the gear shift control unit 94 is the time of the gear shift of the automatic transmission 22 in the D position of the automatic transmission 22 has been illustrated. In this embodiment, a case where the time of the gear shift of the automatic transmission 22 is the time of a gear shift of the automatic transmission 22 (that is, the time of forward or reverse movement switching of the automatic transmission 22) to switch between the D position of the automatic transmission 22 and the R position of the automatic transmission 22 (that is, between the forward gear stage (in particular, the first gear stage "1st") and the reverse gear stage "Rev" of the automatic transmission 22) is illustrated. That is, a case where the request for the gear shift to the automatic transmission 22 is a request (that is, a request for forward or reverse movement switching to the automatic transmission 22) for a gear shift to switch between the forward gear stage and the reverse gear stage of the automatic transmission 22 is illustrated.

During the manual driving, when there is the request for forward or reverse movement switching, as shown in Embodiment 1 described above, it is assumed that the shift lever 52 is operated for D→R switching or R→D switching. During the automatic driving, when there is the request for forward or reverse movement switching, it is assumed that switching between the forward gear stage and the reverse gear stage of the automatic transmission 22 is performed by, for example, an automatic parking system or the like.

Switching between the D position and the R position of the automatic transmission 22 is switching of the gear stages between the forward gear stage and the reverse gear stage of the automatic transmission 22, and similarly to when there is the request for switching of the gear stages in the D position of the automatic transmission 22, the gear shift of the automatic transmission 22 is executed. Accordingly, at the time of forward or reverse movement switching of the automatic transmission 22 (that is, when there is the request for forward or reverse movement switching to the automatic transmission 22), the engagement/release control for outputting the hydraulic control command signal Sat for switching the operation states of the engagement devices C to be switched with forward or reverse movement switching of the automatic transmission 22 to the engagement devices C is executed. With this, the operation states of the engagement devices C are switched. For this reason, the completion of forward or reverse movement switching of the automatic transmission 22 may be determined according to, for example, the completion of the engagement/release control of the engagement devices C. The traveling state determination unit 98 determines whether or not switching (that is, forward or reverse movement switching) between the forward gear stage and the reverse gear stage of the automatic transmission 22 is completed based on, for example, whether or not the engagement/release control of the engagement devices C ends.

The switching inhibition unit 97 inhibits switching between the automatic driving and the manual driving in a case where the traveling state determination unit 98 determines that forward or reverse movement switching of the automatic transmission 22 is not completed when the traveling state determination unit 98 determines that there is the request for switching between the automatic driving and the manual driving and the traveling state determination unit 98 determines that there is the request for the gear shift to the automatic transmission 22 (for example, the request for forward or reverse movement switching to the automatic transmission 22). That is, the switching inhibition unit 97 inhibits switching between the automatic driving and the manual driving until the traveling state determination unit 98 determines that forward or reverse movement switching of the automatic transmission 22 is completed in a case where the traveling state determination unit 98 determines that there is the request for forward or reverse movement switching to the automatic transmission 22 when the traveling state determination unit 98 determines that there is the request for switching between the automatic driving and the manual driving. The driving control unit 96 executes switching between the automatic driving and the manual driving in a case where the traveling state determination unit 98 determines that forward or reverse movement switching of the automatic transmission 22 is completed when the traveling state determination unit 98 determines that there is the request for switching between the automatic driving and the manual driving and the traveling state determination unit 98 determines that there is the request for forward or reverse movement switching to the automatic transmission 22. The driving control unit 96 executes switching between the automatic driving and the manual driving in a case where the traveling state determination unit 98 determines that there is no request for forward or reverse movement switching to the automatic transmission 22 when the traveling state determination unit 98 determines that there is the request for switching between the automatic driving and the manual driving.

Figure 6:
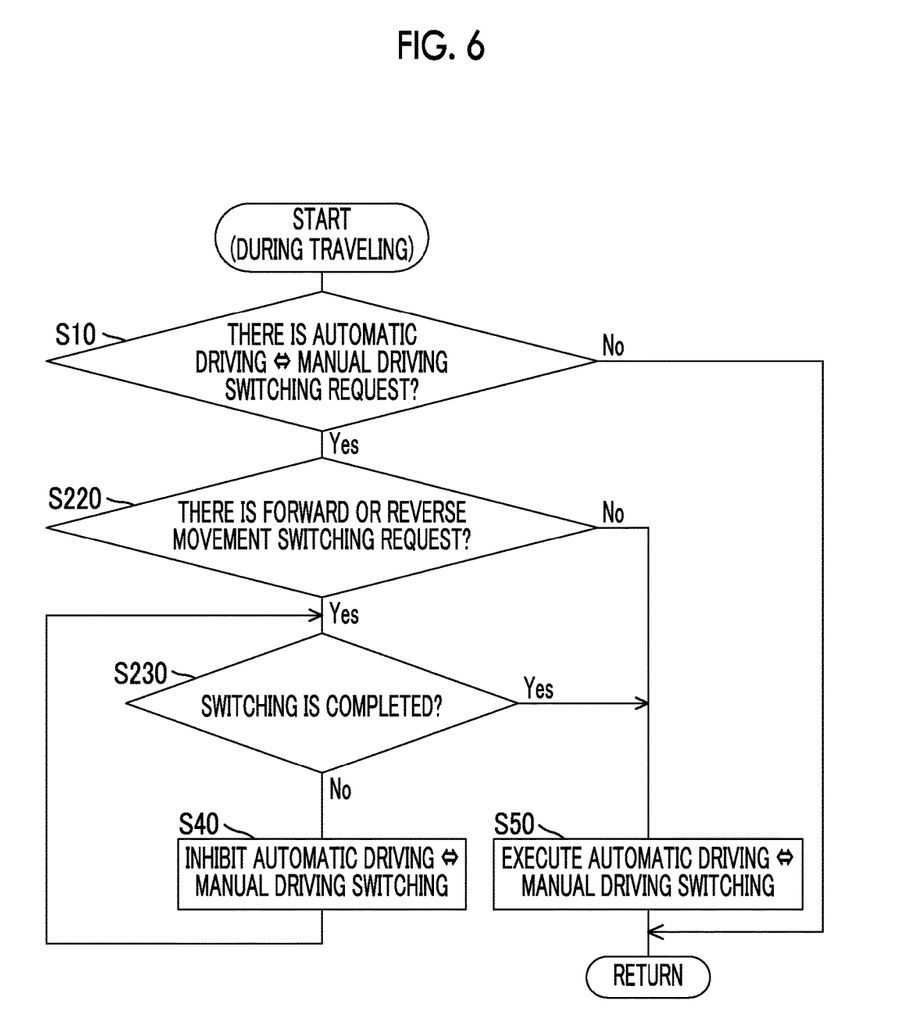
FIG. 6 is a flowchart illustrating a main part of control operation of an electronic control device, that is, control operation for preventing a shock caused by switching between automatic driving and manual driving at the time of a gear shift of the automatic transmission, and shows an embodiment different from FIG. 4.

FIG. 6 is a flowchart illustrating a main part of control operation of the electronic control device 90, that is, control operation for preventing a shock caused by switching between automatic driving and manual driving at the time of a gear shift of the automatic transmission 22, and the flowchart is repeatedly executed during traveling, for example. FIG. 6 shows an embodiment different from FIG. 4.

The flowchart of FIG. 6 is different from the flowchart of FIG. 4 in that the steps of S20 and S30 of FIG. 4 are substituted with steps of S220 and S230, respectively. The difference will be primarily described. In FIG. 6, in a case where the determination of S10 is affirmative, in S220 corresponding to the function of the traveling state determination unit 98, determination is made whether or not there is the request for forward or reverse movement switching to the automatic transmission 22. In a case where the determination of S220 is affirmative, in S230 corresponding to the function of the traveling state determination unit 98, determination is made whether or not forward or reverse movement switching of the automatic transmission 22 is completed. In a case where the determination of S230 is negative, S40 is executed. Next to S40, S230 is executed. In a case where the determination of S220 is negative or in a case where the determination of S230 is affirmative, S50 is executed.

As described above, with this embodiment, at the time of forward or reverse movement switching of the automatic transmission 22, switching between the automatic driving and the manual driving is inhibited until forward or reverse movement switching is completed. For this reason, the control at the time of forward or reverse movement switching is avoided from being switched between the control for the automatic driving and the control for the manual driving, and discontinuity of the control at the time of forward or reverse movement switching does not occur. As a result, as in Embodiment 1 described above, it is possible to prevent a shock caused by switching between the automatic driving and the manual driving at the time of the gear shift of the automatic transmission 22.

Embodiment 4

In Embodiments 1 to 3 described above, various aspects in which switching between the automatic driving and the manual driving is inhibited until the gear shift of the automatic transmission 22 is completed after the gear shift starts have been described. As shown in Embodiment 1 described above, an aspect in which switching to the manual driving is performed in a case where the emergency requirement occurs during the automatic driving has been described. Since the emergency requirement is a situation in which the automatic driving is not performable safely, in a case where the emergency requirement occurs during the automatic driving, it is desirable to perform switching to the manual driving with the highest priority. That is, in a case where the emergency requirement occurs during the automatic driving, it is desirable to perform switching to the manual driving, without inhibiting switching from the automatic driving to the manual driving, even until the gear shift of the automatic transmission 22 is completed after the gear shift starts. For this reason, the switching inhibition unit 97 permits switching from the automatic driving to the manual driving even until the gear shift of the automatic transmission 22 is completed after the gear shift starts when switching from the automatic driving to the manual driving is switched with the occurrence of the emergency requirement.

The above-described aspect in which switching from the automatic driving to the manual driving with the occurrence of the emergency requirement is not inhibited will be described below in connection with a case described in Embodiment 1 described above where the request for the gear shift to the automatic transmission 22 is the request for switching of the gear stages in the D position of the automatic transmission 22.

The traveling state determination unit 98 determines whether or not an emergency requirement occurs in a case where determination is made that there is the request for switching from the automatic driving to the manual driving.

The switching inhibition unit 97 inhibits switching from the automatic driving to the manual driving until the traveling state determination unit 98 determines that the gear shift of the automatic transmission 22 is completed in a case where the traveling state determination unit 98 determines that there is the request for the gear shift to the automatic transmission 22 (for example, the request for switching of the gear stages in the D position of the automatic transmission 22) when the traveling state determination unit 98 determines that there is the request for switching from the automatic driving to the manual driving and the traveling state determination unit 98 determines that the emergency requirement does not occur. The driving control unit 96 executes switching from the automatic driving to the manual driving in a case where traveling state determination unit 98 determines that the emergency requirement occurs when the traveling state determination unit 98 determines that there is the request for switching from the automatic driving to the manual driving. That is, the switching inhibition unit 97 permits switching from the automatic driving to the manual driving even during a period of transition in which the gear shift (for example, switching of the gear stages in the D position of the automatic transmission 22) of the automatic transmission 22 is performed by the gear shift control unit 94 in a case where the traveling state determination unit 98 determines that there is the request for switching from the automatic driving to the manual driving and the traveling state determination unit 98 determines that the emergency requirement occurs.

Figure 7:
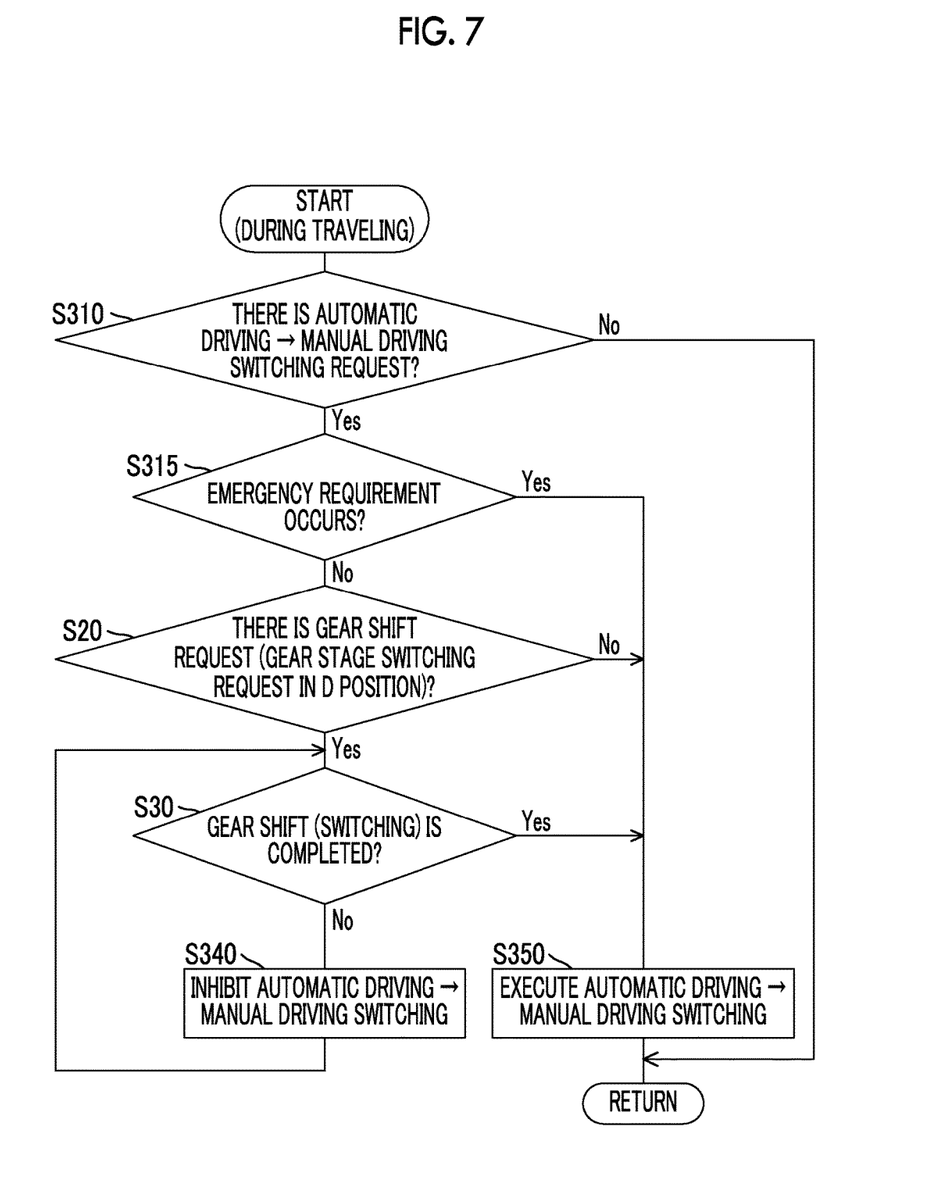
FIG. 7 is a flowchart illustrating a main part of control operation of an electronic control device, that is, control operation for preventing a shock caused by switching between automatic driving and manual driving at the time of a gear shift of the automatic transmission, and shows an embodiment different from FIG. 4.

FIG. 7 is a flowchart illustrating a main part of control operation of the electronic control device 90, that is, control operation for preventing a shock caused by switching between automatic driving and manual driving at the time of a gear shift of the automatic transmission 22, and the flowchart is repeatedly executed during traveling, for example. FIG. 7 shows an embodiment different from FIG. 4.

The flowchart of FIG. 7 is different from the flowchart of FIG. 4 in that the steps of S10, S40, and S50 of FIG. 4 are substituted with steps of S310, S340, and S350, respectively, and a step of S315 is added. The difference will be primarily described. In FIG. 7, first, in S310 corresponding to the function of the traveling state determination unit 98, determination is made whether or not there is the request for switching from the automatic driving to the manual driving. In a case where the determination of S310 is negative, the routine ends. In a case where the determination of S310 is affirmative, in S315 corresponding to the function of the traveling state determination unit 98, determination is made whether or not the emergency requirement occurs. In a case where the determination of S315 is negative, S20 is executed. In a case where the determination of S20 is affirmative, S30 is executed. In a case where the determination of S30 is negative, in S340 corresponding to the function of the switching inhibition unit 97, switching from the automatic driving to the manual driving is inhibited. Next to S340, S30 is executed. In a case where the determination of S315 is affirmative, in a case where the determination of S20 is negative, or in a case where the determination of S30 is affirmative, in S350 corresponding to the function of the driving control unit 96, switching from the automatic driving to the manual driving is executed.

As described above, with this embodiment, as in Embodiments 1 to 3 described above, it is possible to prevent a shock caused by switching from the automatic driving to the manual driving at the time of a gear shift of the automatic transmission 22. When switching from the automatic driving to the manual driving is performed with the occurrence of the emergency requirement, switching from the automatic driving to the manual driving is not inhibited even until the gear shift of the transmission is completed after the gear shift starts. For this reason, in a situation in which the automatic driving is not performable safely, switching from the automatic driving to the manual driving is performed quickly even during a gear shift of the transmission.

Although the embodiments of the disclosure have been described in detail based on the drawings, the disclosure is applied to other aspects.

Various Modification Embodiments

Although the embodiments are independent of each other in the above described embodiments, the embodiments are not necessarily independent of each other. The embodiments may be appropriately combined with each other.

In Embodiment 4 described above, although an aspect in which switching from the automatic driving to the manual driving with the occurrence of the emergency requirement is not inhibited has been described in connection with a case where the request for the gear shift to the automatic transmission 22 is the request for switching of the gear stages in the D position of the automatic transmission 22, the disclosure is not limited to this aspect. The disclosure can also be applied to a case of a request for a gear shift to the automatic transmission 22 (for example, a request for D→B position switching to the automatic transmission 22 or a request for forward or reverse movement switching to the automatic transmission 22) different from the request for switching of the gear stages in the D position of the automatic transmission 22.

In the embodiments described above, although an aspect in which determination is made whether or not the engagement/release control of the engagement devices C according to whether or not the output of the hydraulic control command signal Sat ends has been illustrated, the disclosure is not limited to this aspect. For example, the vehicle 10 may include a hydraulic sensor or a hydraulic switch that detects the clutch pressure Pc supplied to the engagement devices C, and determination may be made whether or not the engagement/release control of the engagement devices C ends according to whether or not the clutch pressure Pc of the engagement devices C, the operation states of which are switched at the time of a gear shift, reaches predetermined hydraulic pressure (for example, hydraulic pressure for bringing the engagement state or hydraulic pressure for bringing the release state).

In Embodiment 1 described above, although an aspect in which the time at which the automatic transmission 22 is shifted is the time at which the automatic transmission 22 is subjected to automatic gear shift control in the D position of the automatic transmission 22 has been illustrated, the disclosure is not limited to this aspect. For example, the time at which the automatic transmission 22 is shifted may be the time at which, during the manual driving, the automatic transmission 22 is subject to manual gear shift control for switching the gear stages of the automatic transmission 22 according to a driver's operation on the shift lever 52, a paddle switch mounted in a steering wheel, or the like in a power transmittable state in which the power transmission path for forward traveling is formed. For example, when the automatic transmission 22 is shifted, the driver may perform an operation to switch the operation position of the shift lever 52 from the B position to the D position.

In the embodiments described above, although the automatic driving basically performs running (acceleration/deceleration), turning (steering), stopping (braking), or the like in the vehicle 10 automatically with control operation by the electronic control device 90 without depending on a driver's driving operation (accelerator operation, steering operation, or brake operation), the disclosure is not limited to this aspect. For example, known cruise control for controlling drive torque such that the vehicle speed follows a set vehicle speed in consideration of an interval from a preceding vehicle or the like may be included in the automatic driving.

In the examples described above, although each gear stage of the forward eight stages is formed in the automatic transmission 22, the disclosure is not limited to this aspect. The automatic transmission 22 may be a stepped transmission in which a plurality of gear stages with different gear ratios is selectively formed. As an automatic transmission, a planetary gear type automatic transmission, such as the automatic transmission 22, or a synchronous meshing type parallel two-shaft automatic transmission, a known dual clutch transmission (DCT) that is a synchronous meshing type parallel two-shaft automatic transmission and includes two systems of input shafts, a continuously variable transmission, an electric continuously variable transmission, a transmission in which a continuously variable transmission (electric continuously variable transmission) and a stepped transmission are connected (provided) in series in the power transmission path, or the like. In summary, the disclosure can be applied as long as a transmission constitutes a part of a power transmission path between a drive power source and drive wheels. In a case where a transmission is a continuously variable transmission, a gear shift of the transmission is, for example, change in target gear shift ratio to an extent corresponding to change in gear ratio due to switching of the gear stages, switching between formation of the power transmission path for forward traveling and the power transmission path for reverse traveling, or the like, instead of switching the gear stages.

In the embodiments described above, although an aspect where the engine 12 is used as a drive power source of the vehicle 10 has been illustrated, the disclosure is not limited to this aspect. For example, for the drive power source, another motor, such as a rotating machine, can be employed along or in combination with the engine 12. Accordingly, the disclosure can also be applied to a vehicle that includes an engine, a transmission constituting apart of a power transmission path between the engine and drive wheels, and a rotating machine coupled to an input rotating member of the transmission such that power transmission is possible. In such a vehicle, at the time of a gear shift of the transmission, it is possible to perform synchronization control with the rotating machine so as to change the engine rotation speed Ne toward the synchronous rotation speed after the gear shift. In a case of executing the synchronization control with the rotating machine during a period of transition of a gear shift of the automatic transmission 22, the completion of the gear shift of the automatic transmission 22 may be determined according to the synchronization control with the rotating machine ends. In a vehicle that includes a rotating machine as a drive power source, since braking torque is generated through regenerative control of the rotating machine, it is possible to apply a regenerative brake as a drive power source brake using the rotating machine.

The above description is merely an embodiment and the disclosure can be implemented in aspects to which various modifications and improvements are added based on knowledge of those skilled in the art.

What is claimed is:

1. A traveling control device for a vehicle, the vehicle including a transmission constituting a part of a power transmission path, the power transmission path being between a drive power source and drive wheels, the traveling control device comprising:
   an electronic control device configured to
      execute a gear shift of the transmission based on a traveling state,
      switch automatic driving by automatic driving control and manual driving by a driving operation from a driver, and
      inhibit switching between the automatic driving and the manual driving until the gear shift of the transmission is completed after the gear shift of the transmission starts.

2. The traveling control device according to claim 1, wherein the electronic control device is configured to, when the gear shift of the transmission is executed in a state where a power transmission path for forward traveling is formed, inhibit the switching between the automatic driving and the manual driving until the gear shift of the transmission is completed.

3. The traveling control device according to claim 1, wherein the electronic control device is configured to, in a state where a power transmission path for forward traveling is formed, when a down-shift of the transmission is executed, to a state in which an effect of a drive power source brake by using the drive power source is enhanced, inhibit the switching between the automatic driving and the manual driving until the down-shift is completed.

4. The traveling control device according to claim 1, wherein the electronic control device is configured to, when forward-reverse movement switching of the transmission in which switching between a state where a power transmission path for forward traveling is formed and a state where a power transmission path for reverse traveling is formed is executed, inhibit the switching between the automatic driving and the manual driving until the forward-reverse movement switching of the transmission is completed.

5. The traveling control device according to claim 1, wherein the electronic control device is configured to
   switch to the manual driving when an emergency requirement that the automatic driving is not performable safely occurs during the automatic driving, and
   permit switching from the automatic driving to the manual driving even until the gear shift of the transmission is completed after the gear shift of the transmission starts when the switching from the automatic driving to the manual driving is performed with occurrence of the emergency requirement.

6. The traveling control device according to claim 1, wherein the traveling state includes at least one of a vehicle speed or a requested drive amount of the vehicle.

7. A vehicle comprising:
   a transmission constituting a part of a power transmission path, the power transmission path being between a power source and drive wheels of the vehicle; and
   an electronic control device configured to
      execute a gear shift of the transmission based on a traveling state including at least one of a vehicle speed or a requested drive amount of the vehicle, switch automatic driving by automatic driving control and manual driving by a driving operation from a driver, and execute the gear shift of the transmission in a state in which switching between the automatic driving and the manual driving is inhibited until the gear shift of the transmission is completed after the gear shift of the transmission starts.

8. The vehicle according to claim 7, wherein the electronic control device is configured to switch to the manual driving when an emergency requirement that the automatic driving is not performable safely occurs during the automatic driving, and permit switching from the automatic driving to the manual driving even until the gear shift of the transmission is completed after the gear shift of the transmission starts when the switching from the automatic driving to the manual driving is performed with occurrence of the emergency requirement.

* * * * *